United States Patent Office 3,002,143
Patented Sept. 26, 1961

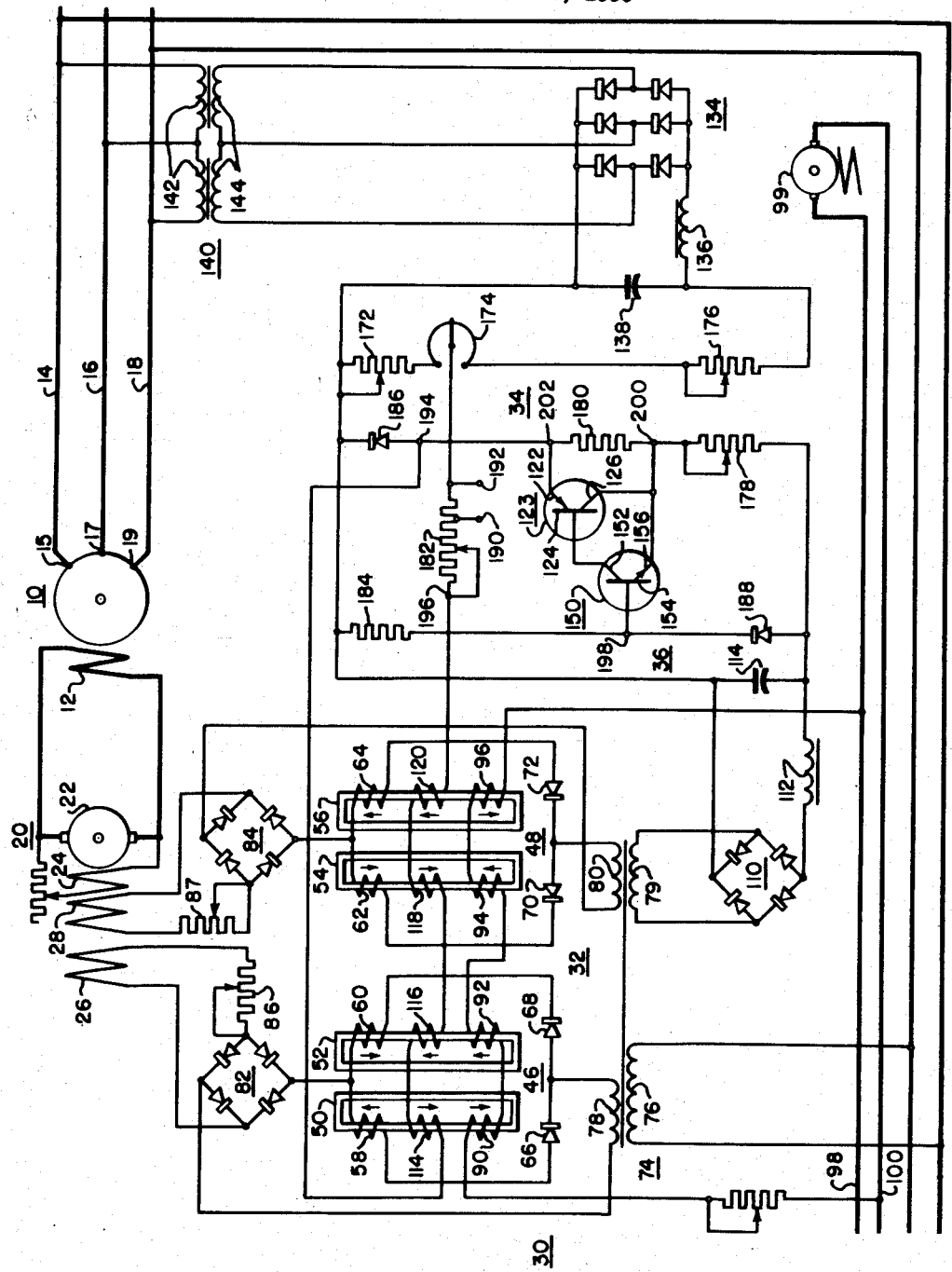

3,002,143
VOLTAGE REFERENCE CIRCUIT FOR GENERATORS
John F. Reuther, Swissvale, Pa., assignor to Westinghouse Electric Corporation, East Pittsburgh, Pa., a corporation of Pennsylvania
Filed Dec. 20, 1956, Ser. No. 629,664
16 Claims. (Cl. 322—36)

This invention relates to regulator systems, and more particularly to voltage reference devices for such regulator systems.

An object of this invention is to provide a new and improved voltage reference circuit for regulator systems.

It is also an object of this invention to provide a voltage reference for regulator systems which will remain substantially constant over a wide range of ambient temperatures and operating frequencies of the input supply voltage without requiring any special frequency compensation or temperature compensation.

Other objects of this invention will become apparent from the following description when taken in conjunction with the accompanying drawings, in which the single figure diagrammatically illustrates this invention.

Referring to the drawing, there is illustrated a dynamoelectric machine, specifically a synchronous generator 10, having an excitation or field winding 12. In this instance, the synchronous generator is disposed to supply power to line conductors 14, 16 and 18, which are a part of a three-phase electrical system. The line conductors are connected to output terminals 15, 17 and 19 of the synchronous generator 10. In order to obtain an excitation voltage across the field winding 12 of relatively large magnitude, an exciter 20 is provided. In this instance, the exciter 20 comprises an armature 22 which supplies current to the field winding 12 of the synchronous generator 10, a self-exciting field winding 24 which is connected in shunt with armature 22 and buck and boost exciter field windings 26 and 28, respectively, the purpose of which will be explained hereinafter. In order to maintain the output voltage of the synchronous generator 10 substantially constant, a regulator system 30, comprising a sensing circuit 34 for producing a direct current error signal which is a measure of the deviation of the terminal voltage across the output of the synchronous generator 10 from its regulated value, and a push-pull magnetic amplifier 32 responsive to the direct current error signal, is interconnected between the output of the synchronous generator 10 and the buck and boost field excitation windings 26 and 28, respectively, of the exciter 20.

In particular, the sensing circuit 34 comprises a main diode 186. This diode 186 is preferably made of some semiconductor material, such as silicon, and is commonly referred to in the art as a Zener diode. During operation, the direct current voltage across the diode 186 remains substantially constant since the voltage applied to the diode 186 is always of greater magnitude than its breakdown voltage. The substantially constant direct current voltage across the diode 186 is compared with a measure of the terminal voltage across the output of the synchronous generator 10, the latter voltage appearing across rheostat 172 and potentiometer 174.

In order to obtain a direct current measure of the terminal voltage across the output of the synchronous generator 10, the input of the rectifier 134 is rendered responsive to the terminal voltage specifically, a step-down potential transformer 140, having a primary winding 142 and a secondary winding 144, is provided, the primary winding 142 being connected to the line conductors 14, 16 and 18, and the secondary winding 144 being connected to the input of a rectifier 134. The output of the rectifier 134 is provided with a filter circuit comprised of the capacitor 138 and the reactor 136 in order to prevent undesirable signals from being applied to the control circuit of the magnetic amplifier 32. The output of the rectifier 134 is then impressed across a voltage dividing circuit consisting of the rheostats 172 and 176 and the potentiometer 174. The potentiometer 174 is provided in order that the regulated terminal voltage can be varied. The rheostats 172 and 176 are provided in order that the range, in which the regulated voltage can be varied, can be adjusted.

In order to obtain a constant voltage across the main diode 186, the transformer 74, with a primary winding 76 connected across the output terminal voltage of the synchronous generator 10, specifically line conductors 14 and 18, and a secondary winding 79 is connected across the input of the rectifier 110. The output of the rectifier 110 is provided with a filter circuit comprised of the capacitor 114 and the reactor 112 in order to prevent undesirable signals from being applied to the control circuit of the magnetic amplifier 32.

In order to limit the magnitude of current through the main diode 186, the resistor 180 and the rheostat 178 are connected in series circuit relationship with the main diode 186, the series circuit being connected across the output of the rectifier 110.

Since it has been found desirable for best performance to maintain the main diode current at a substantially constant value, an auxiliary regulator loop 36 is provided, comprising an auxiliary diode 188 of the same general type as the main diode 186, a junction type transistor 150 having an emitter electrode 156, a collector electrode 152, and a base electrode 154, a junction type transistor 123 having an emitter electrode 122, a collector electrode 126, and a base electrode 124, resistors 180 and 184 and rheostat 178. The rheostat 178 is adjusted so that with the desired current flowing through it, the voltage across it is approximately equal to the voltage across the auxiliary diode 188. Normally, the voltage across the auxiliary diode 188 is slightly higher than the voltage across rheostat 178 and a small current flows into the base 154 of the junction transistor 150 and out its emitter 156 through rheostat 178. This current is amplified and flows into the emitter 122 of the junction transistor 123, out its base 124, and into the collector 152 of the junction transistor 150 and out its emitter 156 through rheostat 178. This second current is again amplified by junction transistor 123, and a current flows into its emitter 122 and out its collector 126 through rheostat 178. An equilibrium condition is reached when sufficient current is bypassed around resistor 180 through junction transistors 123 and 150 to maintain the voltage across rheostat 178 sufficiently close to the voltage across the auxiliary diode 188 so that the proper value of current flows into the base 154 of the junction transistor 150 to maintain the equilibrium condition. In summary, any voltage difference existing between terminals 198 and 200 causes an error current to flow, which is amplified by junction transistors 123 and 150 so as to shunt current around resistor 180 with the result that the voltage difference between terminals 198 and 200 is substantially eliminated. A resistor 184 is provided to limit the magnitude of the current through the auxiliary diode 188.

The error voltage produced by the difference in the direct current voltage across the main diode 186 and the voltage across rheostat 172 and the potentiometer 174 combined will appear across terminals 194 and 192. As illustrated, this error voltage is applied to the control windings 114, 116, 118, and 120 of the magnetic amplifier 32. The rheostat 182 is connected in series circuit relationship between terminal 192 and the control winding 120 of the magnetic amplifier 32 in order to vary the gain of the regulator system 30. If rheostat 182 were provided with a tap as illustrated at terminal 190, limiting signals and compensating signals, such as line drop compensation, could be introduced into the regulator system, through the terminals 190 and 192.

With balanced conditions in the sensing circuit 34, the current in the control windings 114, 116, 118 and 120 of the magnetic amplifier 34 is negligible, and the current into the base 154 of the junction transistor 150 is also negligible compared with the current flowing through the main diode 186. Therefore, the regulator current in rheostat 178 is substantially the same as the current in the main diode 186. If desired, the bias winding of the magnetic amplifier 32 could be connected between terminals 194 and 202, assuming that a bias current regulated to within a few percent is adequate and that the bias winding has low resistance.

The push-pull magnetic amplifier 32 is of standard construction and comprises two main sections, 46 and 48. The section 46 comprises two magnetic core members 50 and 52, and the section 48 comprises two magnetic core members 54 and 56. In this instance, load windings 58, 60, 62 and 64 are disposed in inductive relationship with the magnetic core members 50, 52 and 54 and 56, respectively. As is customary, self-saturation for the magnetic amplifier 32 is obtained by connecting in series circuit relationship with the load windings 58, 60, 62 and 64, the self-saturating rectifiers 66, 68, 70 and 72, respectively.

In order to form a doubler circuit of the section 46, the series circuit, including the load windings 58 and the self-saturating rectifier 66, is connected in parallel circuit relationship with the series circuit including the load winding 60 and the self-saturating rectifier 68. In like manner, in order to form a doubler circuit of the section 48, the series circuit including the load winding 62 and the self-saturating rectifier 70 is connected in parallel circuit relationship with the series circuit including the load winding 64 and the self-saturating rectifier 72.

Energy for the load windings 58, 60, 62 and 64 of the magnetic amplifier 32 is received from a transformer 74 having a primary winding 76, which, in this instance, is responsive to the output voltage of the synchronous generator 10 and secondary winding sections 78, 80 and 79. As illustrated, a full wave dry type load rectifier 82 is connected with the hereinbefore described parallel circuit of the section 46 and with the secondary winding section 78 of the transformer 74 in order to produce a direct current output for the section 46. In like manner, a full wave dry type load rectifier 84 is interconnected with the hereinbefore described parallel circuit of the section 48 and with the secondary winding section 80 of the transformer 74 in order to obtain a direct current output for the section 48.

The boost field winding 28 of the exciter 20 is responsive to the output of the load rectifier 84, and the buck field winding 26 of the exciter 20 is responsive to the output of the load rectifier 82. In operation, the buck field winding 26 opposes the boost field winding 28. In order to provide means for changing the gain in the regulator system 30, variable resistors 87 and 86 are connected in series circuit relationship with the boost field winding 28 and with the buck field winding 26, respectively.

For the purpose of biasing each of the sections 46 and 48 of the magnetic amplifier 32 to approximately half its output, bias windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to conductors 98 and 100, which have applied thereto a substantially constant direct current voltage from the direct current source 99. In operation, the current flow through the bias windings 90, 92, 94 and 96 produces a magnetic inductive force with respect to their respective magnetic core members that opposes the magnetic inductive force produced by the current flow through the load windings 58, 60, 62 and 64, respectively.

Control windings 114, 116, 118 and 120 are disposed in inductive relationship with the magnetic core members 50, 52, 54 and 56, respectively. The control windings 114, 116, 118 and 120 are connected in series circuit relationship with one another, the series circuit being connected across the output terminals 192 and 194 of the sensing circuit 34 in series circuit relationship with rheostat 182 hereinbefore described. The control windings 114, 116, 118 and 120 are responsive to the direct current error signal produced by the sensing circuit 34. The current flow through the control windings 114, 116, 118 and 120 is negligible when the output terminal voltage of the synchronous generator 10 is at its regulated value. Therefore, the outputs of the two sections 46 and 48 of the magnetic amplifier 32 are balanced and the current flow through the buck winding 26 and the boost winding 28 are substantially equal.

In operation, when the output voltage of the synchronous generator 10 increases to a value above a predetermined voltage to which it is regulated, current flows (from left to right on the drawing) from the terminal 194 through control windings 114, 116, 118 and 120 to terminal 192 and thereby decreases the output current from the section 48 of the amplifier 32 and increases the output current from the section 46 of the push-pull magnetic amplifier 32. Such an action increases the current flow through the buck field winding 26 of the exciter 20 and decreases the current flow through the boost field winding 28 to thereby decrease the output voltage of the exciter 20. A decrease in the output voltage of the exciter 20 decreases the magnitude of the voltage across the field winding 12 of the synchronous generator 10 to thereby reduce the output voltage of the synchronous generator 10 to its regulated value.

On the other hand, a decrease in the output voltage of the synchronous generator 10 to a value below its regulated value causes current to flow (from right to left on the drawing) from terminal 192 through the control windings 120, 118, 116 and 114 back to the terminal 194. Current flow in this direction through the control windings 114, 116, 118 and 120 unbalances the push-pull magnetic amplifier 32 in such a way that the output current from the section 48 of the amplifier 32 increases and the output current from the section 46 decreases. Such an action increases the magnitude of the current flow through the boost field winding 28 of the exciter 20 and decreases the magnitude of the current flow through the buck field winding 26. This, in turn, increases the magnitude of the output voltage of the exciter 20 as well as the magnitude of the voltage across the field winding 12 of the synchronous generator 10 to thereby return the magnitude of the output terminal voltage of the synchronous generator to its regulated value.

It is to be understood that the voltage source which causes the breakdown voltage across the main diode and the auxiliary diode of the embodiment of the invention described may be an external source other than the dynamoelectric machine. It is to be understood that the main diode 186 may consist of two or more diodes in a sealed enclosure which are selected so that any change in breakdown voltage is negligible with respect to temperature changes.

The apparatus embodying the teachings of this invention has the advantage that the regulator system 30 comprises static components thus minimizing maintenance problems. In addition, the sensing circuit 34 does not require frequency compensation over a wide range of normal operating frequencies.

Since numerous changes may be made in the above-described apparatus and circuit, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a regulator system for a dynamoelectric machine having a field winding and output terminals, the combination comprising circuit means for obtaining a measure of the terminal voltage of the dynamoelectric machine, a semiconductor device, circuit means for producing a substantially constant voltage across the semiconductor device, means for maintaining current through the semiconductor device substantially constant, circuit means for comparing a measure of the terminal voltage of the dynamoelectric machine with the voltage across the semiconductor device to obtain a net voltage, and further circuit means for controlling the field winding of the dynamoelectric machine in accordance with said net voltage to maintain the terminal voltage of said dynamoelectric machine at substantially a predetermined voltage.

2. In a regulator system for a dynamoelectric machine having a field winding and output terminals, the combination comprising circuit means for obtaining a measure of the terminal voltage of the dynamoelectric machine, a semiconductor diode, circuit means for producing a substantially constant voltage across said semiconductor diode, means for maintaining current through said semiconductor diode substantially constant, circuit means for comparing a measure of the terminal voltage of the dynamoelectric machine with the voltage across the semiconductor diode to obtain a net voltage, and further circuit means for controlling the field winding of the dynamoelectric machine in accordance with said net voltage to maintain the terminal voltage of said dynamoelectric machine at substantially a predetermined voltage.

3. In a regulator system for a dynamoelectric machine having a field winding and output terminals, the combination comprising circuit means for obtaining a measure of the terminal voltage of the dynamoelectric machine, a silicon diode, circuit means for producing a substantially constant voltage across said silicon diode, means for maintaining current through the silicon diode substantially constant, circuit means for comparing the terminal voltage of the dynamoelectric machine with the voltage across the silicon diode to obtain a net voltage, and further circuit means for controlling the field winding of the dynamoelectric machine in accordance with said net voltage to maintain the terminal voltage of said dynamoelectric machine at substantially a predetermined voltage.

4. In a regulator system for a dynamoelectric machine having a field winding and output terminals, the combination comprising circuit means for obtaining a measure of the terminal voltage of the dynamoelectric machine, a semiconductor device, circuit means for producing a substantially constant voltage across the semiconductor device, means for maintaining current through said device at substantially a constant value circuit means for comparing a measure of the terminal voltage of the dynamoelectric machine with the voltage across the semiconductor device to obtain a net voltage, a magnetic amplifier having a control winding and a load winding, said load winding being connected to the field winding of the dynamoelectric machine, and means for applying said net voltage to said control winding of said magnetic amplifier to maintain the terminal voltage of the dynamoelectric machine at substantially a predetermined voltage.

5. In a regulator system for a dynamoelectric machine having a field winding and output terminals, the combination comprising circuit means for obtaining a measure of the terminal voltage of the dynamoelectric machine, a semiconductor diode, circuit means for producing a substantially constant voltage across the semiconductor diode, means for maintaining current through said diode at substantially a constant value circuit means for comparing the terminal voltage of the dynamoelectric machine with the voltage across the semiconductor diode to obtain a net voltage, and a magnetic amplifier having a control winding and a load winding, said load winding being connected to the field winding of the dynamoelectric machine, means for applying said net voltage to said control winding of said magnetic amplifier to control the field winding in accordance with said net voltage to maintain the terminal voltage of the dynamoelectric machine at substantially a predetermined voltage.

6. In a regulator system for a dynamoelectric machine having a field winding and output terminals, the combination comprising circuit means for obtaining a measure of the terminal voltage of the dynamoelectric machine, a silicon diode, circuit means for producing a substantially constant voltage across the silicon diode, means for maintaining current through said diode at substantially a constant value circuit means for comparing a measure of the terminal voltage of the dynamoelectric machine with the voltage across the silicon diode to obtain a net voltage, and a magnetic amplifier having a control winding and a load winding, said load winding being connected to the field winding of the dynamoelectric machine, means for applying said net voltage to said control winding of said magnetic amplifier to control the field winding in accordance with said net voltage to maintain the terminal voltage of the dynamoelectric machine at substantially a predetermined voltage.

7. In a regulator system for a dynamoelectric machine having a field winding and output terminals, the combination comprising circuit means for obtaining a measure of the terminal voltage of the dynamoelectric machine, a semiconductor device, circuit means for producing a substantially constant voltage across said semiconductor device, means for maintaining the current through said device at substantially a constant value circuit means for comparing a measure of the terminal voltage of the dynamoelectric machine with the voltage across said semiconductor device to obtain a net voltage, a self-saturating magnetic amplifier including magnetic core means, a series circuit including a self-saturating rectifier and a load winding disposed in inductive relation with said magnetic core means, a control winding disposed in inductive relationship with the said magnetic core means, said control winding being energized by said net voltage, said load winding being connected to the field winding of the dynamoelectric machine to vary the excitation of the field winding in response to variations in said net voltage and to thereby maintain the terminal voltage of the dynamoelectric machine at substantially a predetermined voltage.

8. A regulator system for a dynamoelectric machine having a field winding and output terminals, the combination comprising circuit means for obtaining a measure of the terminal voltage of the dynamoelectric machine, a semiconductor diode, circuit means for producing a substantially constant voltage across the semiconductor diode, means for maintaining the current through said diode at substantially a constant value circuit means for comparing a measure of the terminal voltage of the dynamoelectric machine with the voltage across the semiconductor diode to obtain a net voltage, a self-saturating magnetic amplifier including magnetic core means, a series circuit including a self-saturating rectifier and a load winding disposed in inductive relation with said magnetic core means, a control winding disposed in inductive relationship with said magnetic core means, said control winding being responsive to said net voltage, output from said load winding being applied to the field winding of the dynamoelectric machine to control the excitation of the field winding in accordance with variations in said net voltage and to thereby maintain the terminal voltage of the dynamoelectric machine at substantially a predetermined value.

9. In a regulator system for a dynamoelectric machine having a field winding and output terminals, the combination comprising circuit means for obtaining a measure of the terminal voltage of the dynamoelectric machine, a silicon diode, circuit means for producing a substantially constant voltage across said silicon diode, means for maintaining the current through said diode at substantially a constant value, circuit means for comparing a measure of the terminal voltage of the dynamoelectric machine with the voltage across said silicon diode to obtain a net voltage, a self-saturating magnetic amplifier including magnetic core means, a series circuit including a self-saturating rectifier and a load winding disposed in inductive relation with said magnetic core means, a control winding disposed in inductive relationship with said magnetic core means, said control winding being responsive to said net voltage, said load winding being connected to the field winding of the dynamoelectric machine to control the excitation of the field winding in accordance with variations in said net voltage to maintain the terminal voltage at substantially a predetermined voltage.

10. In a regulator system for a dynamoelectric machine having a field winding and output terminals, the combination comprising a sensing circuit for producing a direct current error signal which error signal is a measure of the deviation of the terminal voltage of the dynamoelectric machine from a predetermined voltage, said sensing circuit comprising means for comparing a substantially constant voltage drop across a semiconductor device with a direct current measure of the terminal voltage and means for maintaining the current through said device at substantially a constant value, a magnetic amplifier including magnetic core means and having a load winding and a control winding disposed in inductive relationship with said magnetic core means, said control winding being responsive to said direct current error signal, said load winding being connected to the field winding of the dynamoelectric machine to control the excitation of the field winding in accordance with said direct current error signal to maintain the terminal voltage of the dynamoelectric machine at substantially a predetermined voltage.

11. In a voltage reference device, the combination comprising, a semiconductor device, first means connected in circuit relation with said device for producing a substantially constant voltage across said semiconductor device, and second means connected in circuit relation with said device for maintaining the current through said semiconductor device at substantially a constant value.

12. In a voltage reference device, the combination comprising, a semiconductor diode, first means connected in circuit relation with said diode for producing a substantially constant voltage across said semiconductor diode, and second means connected in circuit relation with said diode for maintaining the current through said semiconductor diode at substantially a constant value.

13. In a voltage reference device, the combination comprising, a silicon diode, first means connected in circuit relation with said diode for producing a substantially constant voltage across said silicon diode, and second means connected in circuit relation with said diode for maintaining the current through said silicon diode at substantially a constant value.

14. In a voltage reference device, the combination comprising, a semiconductor device having a substantially constant breakdown voltage associated therewith, a source of voltage having a magnitude greater than said breakdown voltage connected in circuit relation with said device for producing a substantially constant voltage across said semiconductor device, and a regulator loop connected in circuit relation with said semiconductor device for maintaining the current through said device after breakdown at substantially a predetermined value.

15. In a voltage reference diode, the combination comprising, a semiconductor diode having a substantially constant breakdown voltage associated therewith, a source of voltage having a magnitude greater than said breakdown voltage connected in circuit relation with said diode for producing a substantially constant voltage across said semiconductor diode, and a regulator loop connected in circuit relation with said semiconductor diode for maintaining the current through said diode after breakdown at substantially a predetermined value.

16. In a voltage reference diode, the combination comprising, a first silicon diode having a substantially constant breakdown voltage associated therewith, a source of voltage having a magnitude greater than said breakdown voltage connected in circuit relation with said diode for producing a substantially constant voltage across said first silicon diode, and a regulator loop connected in circuit relation with said first silicon diode for maintaining the current through said diode after breakdown at substantially a predetermined value, said regulator loop including a second silicon diode having a substantially constant breakdown voltage associated therewith.

References Cited in the file of this patent

UNITED STATES PATENTS

| | | |
|---|---|---|
| 2,456,938 | Harder | Dec. 21, 1948 |
| 2,525,451 | Graves | Oct. 10, 1950 |
| 2,677,097 | Carleton | Apr. 27, 1954 |
| 2,693,570 | Bergson | Nov. 2, 1954 |
| 2,712,107 | Bradley | June 28, 1955 |
| 2,740,086 | Evans et al. | Mar. 27, 1956 |
| 2,776,382 | Jensen | Jan. 1, 1957 |
| 2,806,990 | Evans | Sept. 17, 1957 |
| 2,809,301 | Short | Oct. 8, 1957 |
| 2,862,175 | Guyton et al. | Nov. 25, 1958 |